May 7, 1935.　　　　G. R. WOOD　　　　2,000,156

COIN SCALE

Filed May 23, 1933　　　　4 Sheets-Sheet 1

INVENTOR
George R. Wood
BY
ATTORNEY

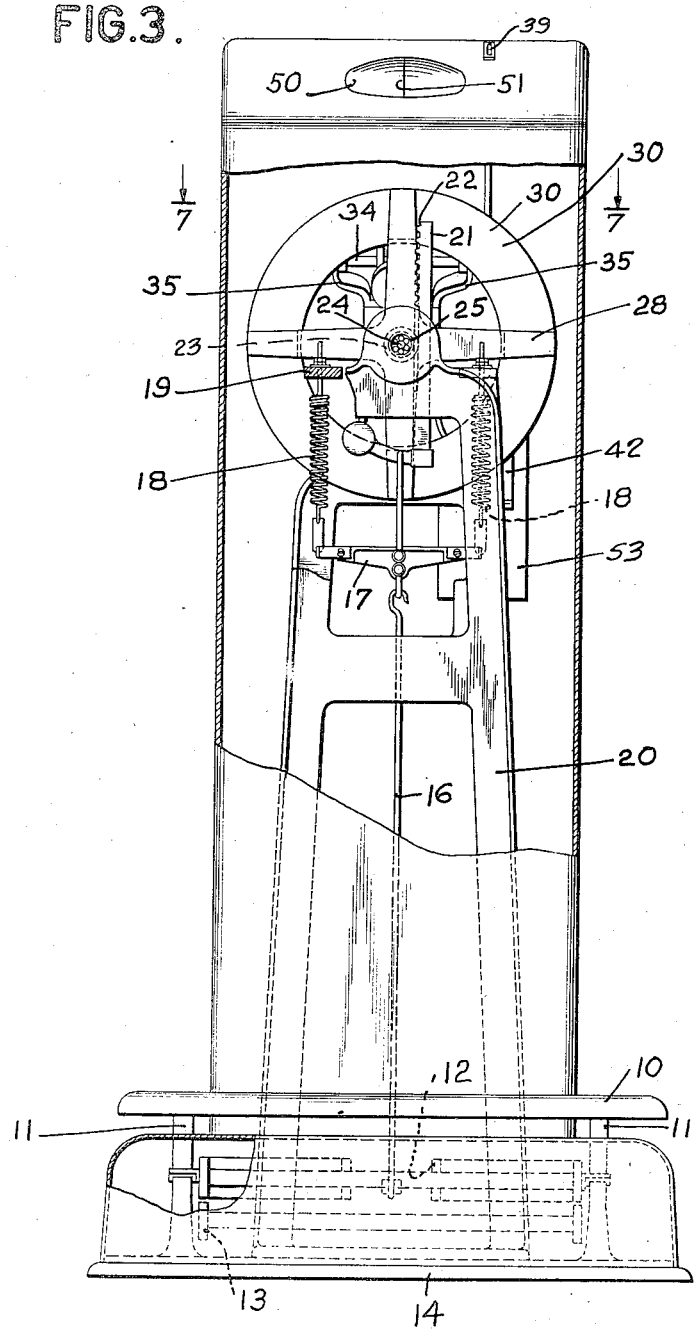

May 7, 1935. G. R. WOOD 2,000,156
COIN SCALE
Filed May 23, 1933 4 Sheets-Sheet 3
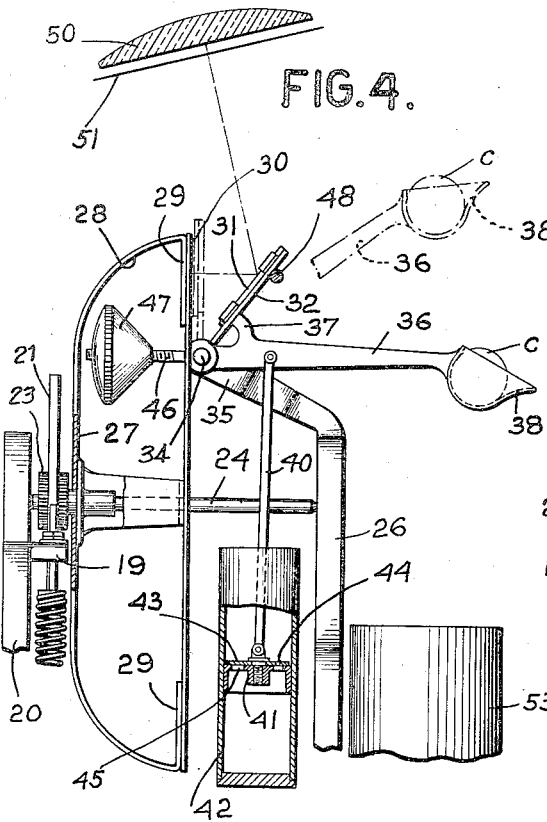
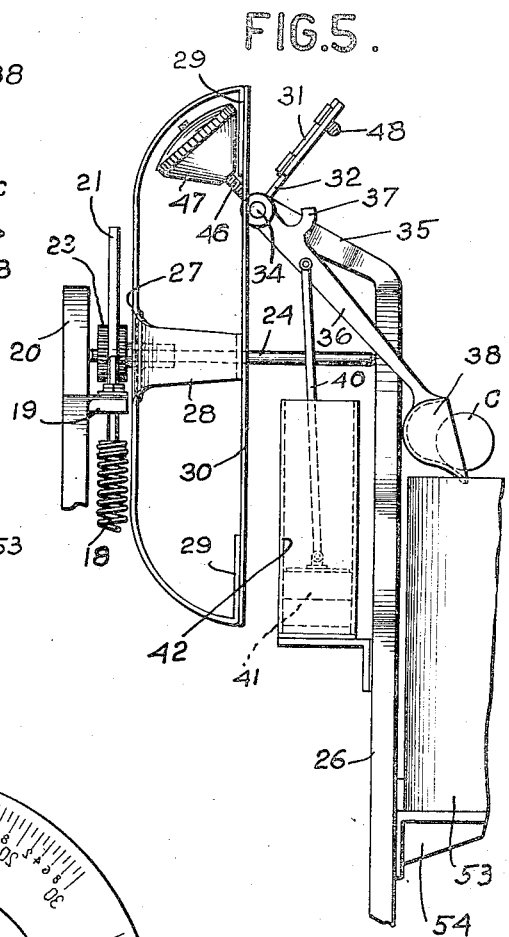
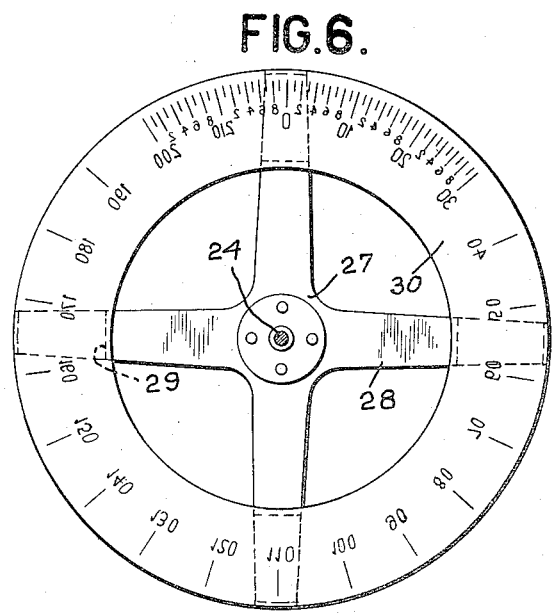
INVENTOR
George R. Wood
BY
ATTORNEY May 7, 1935.　　　　　G. R. WOOD　　　　　2,000,156
COIN SCALE
Filed May 23, 1933　　　　4 Sheets-Sheet 4

INVENTOR
George R. Wood
BY
ATTORNEY

Patented May 7, 1935

2,000,156

UNITED STATES PATENT OFFICE 2,000,156

COIN SCALE

George R. Wood, Toronto, Ontario, Canada, assignor, by mesne assignments, to International Business Machines Corporation, New York, N. Y., a corporation of New York Application May 23, 1933, Serial No. 672,385

5 Claims. (Cl. 194—95)

This case relates to person weighing scales.

The object of the invention, in general, is to provide a simple and novel coin scale for weighing persons.

More specifically, an object is to provide a coin scale in which the weight is not indicated until the scale reaches equilibrium and the parts are at rest.

Another object is to provide a coin scale in which the duration of the weighing indication after a person steps on the platform and deposits a coin is limited although the individual remains on the platform.

Still another object is to provide a load controlled indicator in a coin scale not directly visible from the exterior of the scale but an indication from which is visible in a mirror located inside the scale.

Further and other objects and advantages will be hereinafter set forth in the accompanying specification and claims, and shown in the drawings, which by way of illustration show what is now considered to be the preferred embodiment of the invention.

In the drawings:

Fig. 3 is a front view with part of the casing broken away to show the interior;

Fig. 4 is an end view of the chart and coin controlled parts showing the latter in intermediate and weight indicating position;

Fig. 5 is a view similar to Fig. 4 showing the parts at a subsequent time;

Fig. 6 is a view looking at the chart and its frame;

Figure 2:
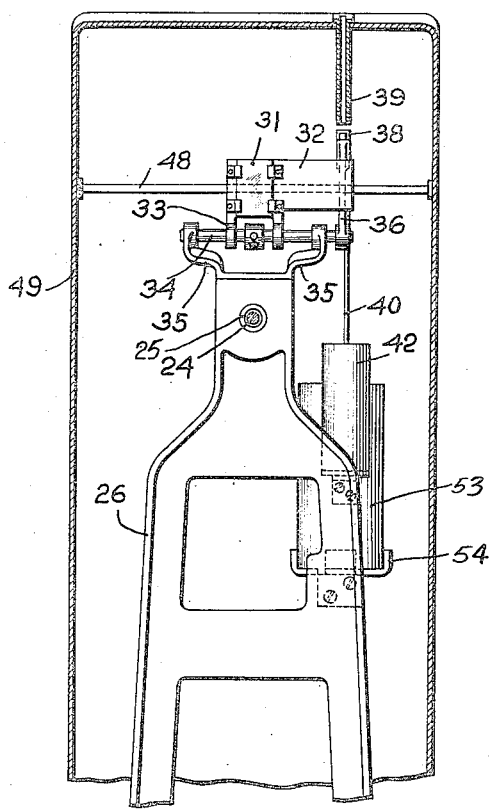
Fig. 2 is a section on line 2—2 of Fig. 1.

The weighing mechanism is of conventional form including platform 10 connected by legs 11 to base levers 12 and 13 fulcrumed on the base frame 14. To the nose iron 15 of lever 12 is connected the lower end of draft rod 16 hooked at its upper end to an equalizer 17, opposite ends of which are hung from load resistant springs 18. The upper ends of springs 18 are supported by lugs 19 projecting from the vertical standard 20 rising from base frame 14. The equalizer 17 also has a central connection to a rack member 21, the teeth 22 of which mesh with pinion 23 on the indicator shaft 24. Shaft 24 is journaled at opposite ends in ball bearings 25, the left hand bearing (as viewed in Fig. 1) being fixed in the upper reduced part of standard 20 and the other bearing being in the similar upper reduced part of a standard 26 parallel to standard 20 and also rising from base 14. Intermediate its ends, shaft 24 rigidly mounts the dished spider frame 27, spokes 28 of which at their outer ends are bent radially inward to provide flanges or lips 29 to which the flat ring chart 30 is secured.

To dampen oscillation of the weighing mechanism, a bracket 300 carried by the nose end of the lever 12 is connected to the plunger rod 301 of a plunger (not shown) movable in a dash pot 302 containing a damping fluid, usually glycerine.

Chart 30 has weight indications reversed with respect to a vertical sighting plane and adapted to be correctly seen in a mirror 31. The mirror is carried by a supporting plate 32 in position to reflect the upper, vertical, central portion of chart 30. Plate 32 has sleeves 33 freely rotatably mounted on a shaft 34 which is journaled adjacent opposite ends in vertical brackets 35 integrally extending from the reduced upper end of rear standard 26.

Fixed to one end of shaft 34 is an arm 36 having a transversely projecting lug 37 for engaging the back of supporting plate 32 of mirror 31. The outer end of arm 36 has a coin receiving cup 38 which in its initial position, indicated in Fig. 1 and in Fig. 4 (in dotted lines) is directly below the coin chute 39. Pivoted to arm 36 is a link 40 which at its lower end is pinned to a plunger 41 movable within an air dash pot 42 carried by bracket 430 extending from rear standard 26.

The plunger 41 rotatably carries a valve plate 43 with openings 44 which may be moved to different degrees of registration with ports 45 of the plunger to thereby adjust the checking action of the dash pot on the plunger when the latter descends or rises.

About mid-way, shaft 34 rigidly carries a threaded arm 46 passing behind chart 30 into the dished frame 27 and there provided with poise 47 threaded on the arm. By locating the end of arm 46 and the poise 47 within the area bounded by the frame 27, the space inside the frame is taken advantage of thus providing a more compact arrangement than if the arm 46 and poise 47 were to one side of the chart and frame.

Figure 1:
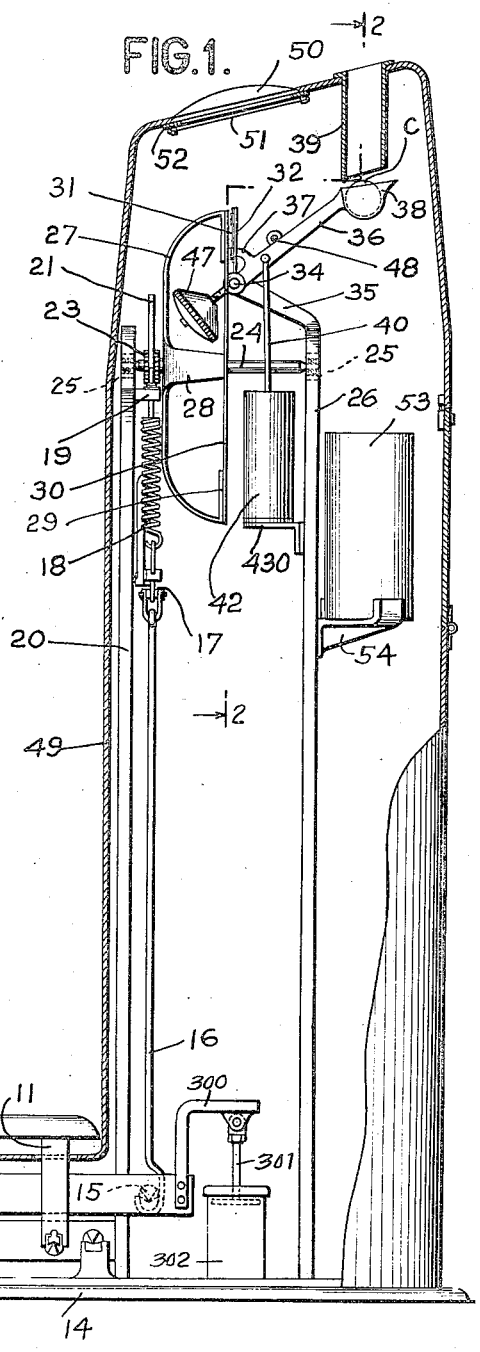
Fig. 1 is a side elevation of the scale with the casing in section.
Figure 7:
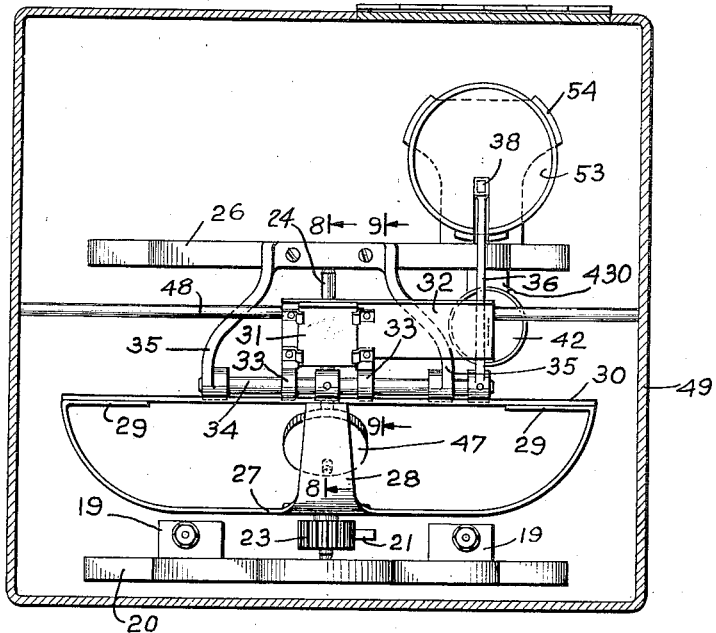
Fig. 7 is a top view of the chart and coin controlled parts.
Figure 8:
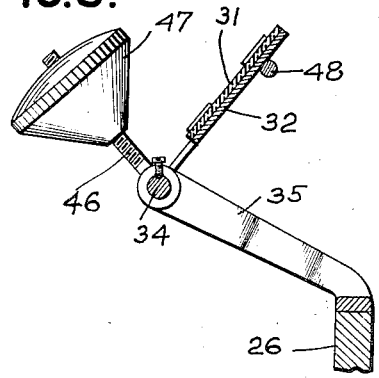
Fig. 8 is a section on line 8—8 of Fig. 7.
Figure 9:
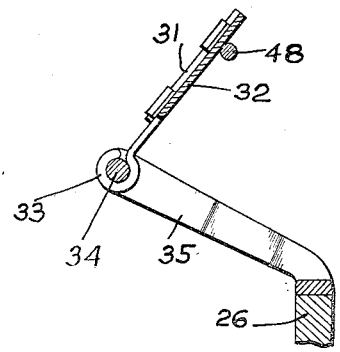
Fig. 9 is a section on line 9—9 of Fig. 7.

Poise 47 is adjusted along arm 46 to just over-balance arm 36 and the mirror assembly when the parts are in initial position, shown in Fig. 1 and in dotted lines in Fig. 4. In this position lug 37 is maintaining the mirror assembly generally parallel to the chart plane. When a proper coin C is deposited through chute 39 in cup 38, the weight of the coin added to that of arm 36 and the mirror assembly is sufficient to overbalance arm 46 and poise 47 and rock shaft 34 and arm 36 clockwise, as viewed in Figs. 1, 4 and 5 away from initial position against the checking and retarding influence of the air dash pot 42. As arm 36 rocks clockwise, mirror 31 and its backing plate 32 follow lug 37 until plate 32 encounters rod 48 carried between the sides of casing 49.

The mirror and plate are thus stopped in the full line position indicated in Figs. 4 and 5 which may be termed the indicating position. In this position, the mirror 31 is at such an angle that the reflection of the chart indications in the mirror may be seen through a spherical magnifying lens 50 held in the top wall of housing 49 of the scale. The load indication is read against the zero line 51 carried inside the scale by frame 52 which mounts the lens 50 on the housing 49.

After the mirror stops in indicating position, arm 36 still continues to move against the retarding influence of dash pot 42 until the arm reaches the position shown in Fig. 5. In this position, coin C falls from cup 38 into a storage receptacle 53 carried by a bracket 54 secured to standard 26. The weight of the coin no longer acting on arm 36, counterpoise 47 overbalances arm 36 and returns the arm counterclockwise against the retarding influence of dash pot 42. When the arm on its return stroke reaches the full line position shown in Fig. 4, its lug 37 engages plate 32 and moves the plate and mirror 31 counterclockwise to initial position in readiness for the next operation.

In the interval during which the mirror 31 is moving clockwise from initial dotted line position to full line reading position, as shown in Fig. 4, there is no indication of the load visible through the lens 50. In this interval which may be termed the weighing interval, the weighing mechanism which has been set in motion by a person stepping on the platform comes to equilibrium and the chart 30 has moved to a position corresponding to the load. To provide for the weighing mechanism reaching equilibrium before the mirror is in viewing position, the mirror movement is timed or retarded by dash pot 42, acting through arm 36 to prevent the mirror reaching viewing position until the chart 30 is substantially at rest. The timing of the mirror movement may be varied to suit conditions by shifting valve plate 43 to adjust the retarding effect of the dash pot.

The mirror remains in viewing position during the interval between the movement of arm 36 from full line position, Fig. 4, to its position in Fig. 5 and the return. This interval which may be termed the reading interval is also timed by dash pot 42 and is sufficient to permit the person on the platform to read the weight after depositing a coin in chute 39. The reading interval terminates when lug 37 on arm 36 encounters plate 32 on the return movement of the arm and begins to move the plate 32 and its mirror 31 counterclockwise away from reading position towards initial position.

Should the individual remain on the platform after this reading interval, there will be no load indication. This is obviously true also if an additional person steps on the platform while the first is still on the platform regardless of whether the first person thereafter continues to stay on the platform or steps off after the second person has stepped on. Accordingly, only a single weight indication may be obtained by a person stepping on the platform and depositing a single coin.

The operation is briefly summarized as follows:

An individual steps on platform 10 and deposits a coin in slot 39. The weighing mechanism is set in operation as soon as the person steps on the platform to rotate the chart 30. While the chart is still in motion, the arm 36, because of the weight of the deposited coin C, overbalances weight 47 and moves clockwise from dotted to full line positions, Fig. 4, against the retarding and timing action of dash pot 42. Mirror 31 follows arm 36 clockwise until its carrying plate 32 encounters rod 48 which stops the mirror in indicating position. By this time, the weighing mechanism and chart are at rest and a steady and correct indication of the load may be seen in mirror 31 through magnifying lens 50. The mirror remains in indicating position while arm 36 continues to move clockwise to drop the coin C in storage receptacle 53.

When the coin escapes from cup 38 of arm 36, the arm is returned counterclockwise by weight 47. During this return movement, stop 37 on arm 36 encounters mirror support 32 and moves the mirror out of viewing position, terminating the reading interval and returning the mirror to initial position. The continued presence of weight on the platform after the reading interval does not result in a further indication unless an additional coin is deposited.

While there has been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. In a coin scale, a load platform, weighing mechanism controlled thereby including a concealed load indicator, means for bringing the load indication of the indicator into view, coin controlled mechanism for receiving a coin for a limited, predetermined interval after which the coin is automatically released independently of the weighing mechanism, the coin controlled mechanism being effective upon reception of a coin for causing operation of said means, a device cooperating with the coin controlled mechanism for delaying operation of said means to retard exposure of the load indication until the indicator is substantially at rest, and means controlled by the coin mechanism after release of the coin for restoring said first-named means to initial, non-exposing position regardless of the operation of said weighing mechanism.

2. In a coin scale, a load platform, weighing mechanism controlled thereby including a load indicator the indications of which are normally unreadable, means for bringing the load indication of the indicator into view, reciprocable coin controlled mechanism for receiving a coin and set in motion a forward stroke by the weight of the coin to cause operation of said means to bring the load indication into view, a retarding device coacting with the coin controlled mechanism during its initial motion under the force of the coin for delaying operation of said means to prevent exposure of the load indication until the indicator is substantially at rest, the coin controlled mechanism automatically releasing said coin at the end of its forward stroke independently of the weighing mechanism, and means for moving the coin mechanism on its return stroke after release of the coin to thereby restore said first-mentioned means to initial non-exposing position regardless of the operation of the weighing mechanism.

3. In a coin scale, a load platform, weighing mechanism controlled thereby including a load indicator the indications of which are normally unreadable, means for bringing the load indication of the indicator into view, coin controlled mechanism for receiving a coin and set in motion by the weight of the coin to cause operation of said means to bring the load indication into view, and a retarding device coacting with the coin controlled mechanism during its initial motion under the force of the coin for delaying operation of said means to prevent exposure of the load indication until the indicator is substantially at rest, said coin controlled mechanism and said means being relatively movable to permit the coin controlled mechanism to subsequently move apart from said means after the latter has brought the load indication into view, said subsequent movement taking place under control of said retarding device to provide an extended interval for exposure by said means of the load indication.

4. A coil scale having a platform, weighing mechanism controlled thereby including a normally unreadable load indicator, coin controlled mechanism including an element for bringing the indicator into view and a reciprocatable member engaged by a coin to be moved downwardly by the force of the coin, said element and member being in abutting engagement with the element having a portion resting on the member and tending to follow the member upon a downward stroke of reciprocation of the latter, a stop for limiting said following movement of said element and to locate the latter in indicator exposing position while the member continues to move further under the force of the coin to complete its downward stroke at the termination of which it releases the coin, release of the coin causing the member to return upwardly and to engage the element at an intermediate point of its return stroke to place the element in non-exposing position, the interval of disengagement of the element and member during both strokes of the latter providing sufficient time for reading the load indication of the indicator.

5. The invention according to claim 4, and means coacting with the coin controlled mechanism from the beginning of its downward stroke to delay exposure by said element of the load indication until the indicator has been given time to come to rest under the load.

GEORGE R. WOOD.